United States Patent [19]
Sahara

[11] 4,282,286
[45] Aug. 4, 1981

[54] PROCESS FOR MAKING DESTRUCTIBLE MARKING FILM AND METHOD FOR MARKING

[75] Inventor: Masao Sahara, Uozu, Japan

[73] Assignee: Nippon Carbide Kogyo Kabushiki Kaisha, Japan

[21] Appl. No.: 99,717

[22] Filed: Dec. 3, 1979

Related U.S. Application Data

[62] Division of Ser. No. 952,134, Oct. 17, 1978.

[51] Int. Cl.³ ...................... B32B 27/20; B32B 27/30; B32B 31/04; B32B 31/12

[52] U.S. Cl. ................................ 428/339; 156/306.3; 156/307.3; 264/175; 264/345; 264/346; 264/DIG. 73; 428/522

[58] Field of Search ............... 428/518, 520, 522, 339; 264/175, 345, 346, DIG. 73; 525/166; 156/306.3, 307.3

[56] References Cited

U.S. PATENT DOCUMENTS

| | | | |
|---|---|---|---|
| 3,758,661 | 9/1973 | Yamamoto et al. | 264/345 |
| 3,953,650 | 4/1976 | Sauer et al. | 428/522 |
| 4,100,325 | 7/1978 | Summers et al. | 428/520 |
| 4,121,016 | 10/1978 | Garrison, Jr. | 428/522 |
| 4,124,431 | 11/1978 | Schramer et al. | 428/522 |
| 4,140,740 | 2/1979 | Smedt et al. | 264/345 |

*Primary Examiner*—William J. Van Balen
*Attorney, Agent, or Firm*—Wenderoth, Lind & Ponack

[57] ABSTRACT

A destructible marking film having a thickness of about 30 to about 60 microns and a destructibility of not more than 60 kg.cm/mm, said film being composed of a resin composition consisting essentially of (A) 100 parts by weight of a vinyl chloride resin having a degree of polymerization of about 600 to about 2000 and containing 0 to about 5% by weight of a comonomer unit, (B) about 5 to about 20 parts by weight of an alkyl methacrylate resin, (C) about 5 to about 30 parts by weight of a liquid plasticizer, (D) about 10 to about 150 parts by weight of a pigment, and (E) 0 to about 10 parts by weight of at least one additive selected from the group consisting of lubricants and stabilizers. The film can be prepared by shaping the above-defined resin composition by calendering.

4 Claims, No Drawings

PROCESS FOR MAKING DESTRUCTIBLE MARKING FILM AND METHOD FOR MARKING

This is a division, of application Ser. No. 952,134, filed Oct. 17, 1978.

This invention relates to destructible films which are useful for a wide range of marking purposes, for example as certifying seals, sealing and other labels, decorative or display stickers for motor vehicles and containers, advertisement display stickers used to mark figures and letters on signboards, and various display stickers such as traffic markings, road markings, guide boards, danger warning markings and markings on merchandize.

For use in these applications, marking films are required to have suitable destructibility whereby a break occurring in one part does not extend to the surrounding other part. In addition, they should desirably possess good operability in an operation of bonding to a substrate, good thermal stability, ease of manufacturing operation, low cost, environmental safety during manufacture, good productivity, good surface smoothness, and good reproducibility of quality.

The present invention relates to destructible marking films having good operability in an operation of bonding to a substrate, good thermal stability, ease of manufacturing operation, low cost, environmental safety during manufacture, good productivity, good surface smoothness and good reproducibility of destructibility.

Specifically, the present invention provides a destructible marking film having a thickness of about 30 to about 60 microns and a destructibility of not more than 60 kg.cm/mm, said film being composed of a resin composition consisting essentially of (A) 100 parts by weight of a vinyl chloride resin having a degree of polymerization of about 600 to about 2000 and containing 0 to about 5% by weight of a comonomer unit, (B) about 5 to about 20 parts by weight of an alkyl methacrylate resin, (C) about 5 to about 30 parts by weight of a liquid plasticizer, (D) about 10 to about 150 parts by weight of a pigment, and (E) 0 to about 10 parts by weight of at least one additive selected from the group consisting of lubricants and stabilizers; to a process for producing said destructible marking film by calendering; and to a method for marking using said destructible marking film.

Destructible films for marking have heretofore been produced solely by a casting method (coating method). This is firstly because conventional destructible marking films are ultrathin films with a thickness of less than about 70 microns, usually up to about 30 microns. If it is desired to form such a thin and substantially unstretched film by a melt-extrusion method, there is no choice but to adopt an extremely slow extruding speed. As a result, thickness unevenness occurs considerably. Furthermore, the film naturally undergoes heat decomposition over an extended period of time, and its deterioration cannot be avoided. Such a method is never commercially feasible.

Secondly, when it is desired to form such an ultrathin, substantially unstretched film by a calender method, the roll-separating force increases. The roll pressure should therefore be reduced drastically, and an extreme decrease in the speed of production cannot be avoided. It is actually impossible for this method to give an ultrathin film having substantially no directionality and a uniform thickness.

If, therefore, it is desired to obtain an ultrathin film by the melt-extruding or calendering method, the resulting film must be made thinner by a stretching operation. The stretched films, however, are not acceptable as destructible marking films.

The production of destructible marking films has many disadvantages including poor operability in a bonding operation, poor thermal stability, the complexity of the manufacturing operation, the high cost of production, poor safety of the working environment associated with the use of solvent, the necessity of recovering the solvent, low productibility, poor surface smoothness (formation of pockmark-like spots) ascribable to the volatilization of the solvent, and the difficulty of adjusting the destructibility of the film to the desired one.

The present inventors made investigations in order to provide destructible marking films and a process for their production, which are free from the defects of conventional destructible marking films and conventional methods for their production. These investigations have led to the surprising discovery that by using a pigment-containing resin composition comprising specified proportions of a vinyl chloride resin, an alkyl methacrylate resin, and a liquid plasticizer, preferably further containing a lubricant or stabilizer, substantially unoriented destructible marking films having a very uniform thickness can be produced by a calender method at feasible speeds of production without causing any of the disadvantages of the prior art described hereinabove.

It is an object of this invention therefore to provide an ultrathin destructible calender film for marking which is far superior to conventional products.

Another object of this invention is to provide a process for producing this new and excellent destructible marking film.

Still another object of this invention is to provide a method for marking using such a destructible marking film.

Other objects and advantages of this invention will become more apparent from the following description.

The destructible film of the invention has a destructibility, as measured by a punch-type impact testing method, of not more than 60 kg.cm/mm, preferably about 2 to about 25 kg.cm/mm, more preferably not more than about 15 kg.cm/mm.

The destructible marking film of the invention is an ultrathin calender film having a thickness of about 30 to about 60 microns which is composed of a pigment-containing resin composition containing 100 parts by weight of a vinyl chloride resin having a degree of polymerization of about 600 to about 2000 and optionally containing not more than about 5% by weight of a comonomer component, about 5 to about 20 parts by weight of an alkyl methacrylate resin, and about 5 to about 80 parts by weight of a liquid plasticizer. The above pigment is contained preferably in an amount of about 10 to 150 parts by weight per 100 parts by weight of the vinyl chloride resin. The destructible marking film of this invention also preferably contains about 1 to about 10 parts by weight of a lubricant. Furthermore, the destructible marking film of this invention may contain a stabilizer in an amount of up to about 10% by weight per 100 parts by weight of the vinyl chloride resin.

The vinyl chloride resin used in this invention has a degree of polymerization of about 600 to about 2000, preferably about 600 to about 1600. If its degree of polymerization is less than about 600, the film becomes too brittle and has poor operability in bonding. Moreover, its thermal stability also becomes inferior. On the other hand, if its degree of polymerization exceeds about 2000, the productivity is reduced, and production at commercially feasible speeds is impossible. The vinyl chloride resin may contain up to about 5% by weight of a comonomer component such as ethylene, propylene, butene, vinyl acetate, an alkyl acrylate, vinylidene chloride, a vinyl ester of a vinyl ether.

The alkyl methacrylate resin used in the invention includes, for example, mixtures of alkyl methacrylate polymers with the alkyl group containing 1 to 3 carbon atoms and alkyl methacrylate polymers with the alkyl group containing 4 to 10 carbon atoms, and copolymers of alkyl methacrylates with the alkyl group containing 1 to 3 carbon atoms and alkyl methacrylates with the alkyl group containing 4 to 10 carbon atoms.

If the amount of the alkyl methacrylate resin is too small, the productivity is markedly aggravated, and the resulting film has an unsatisfactory destructibility. On the other hand, if it is too large, the film is brittle, has poor chemical resistance and loses its utility.

The destructible marking film of this invention also contains a liquid plasticizer in an amount of about 5 to about 80 parts by weight per 100 parts by weight of the vinyl chloride resin. Specific examples of the liquid plasticizer include phthalic acid derivatives such as dimethyl phthalate, diethyl phthalate, dibutyl phthalate, di-(2-ethylhexyl) phthalate, di-n-octyl phthalate, esters formed between higher alcohols and phthalic acid, diisooctyl phthalate, diisobutyl phthalate, dipentyl phthalate, diisodecyl phthalate, ditridecyl phthalate, diundecyl phthalate, di(heptylnonylundecyl) phthalate, benzyl phthalate, butyl benzyl phthalate, dinonyl phthalate, di-n-alkyl phthalates, and di-n- (or iso-)alkyl phthalates; isophthalic acid derivatives such as dimethyl isophthalate, di-(2-ethylhexyl) isophthalate and diisoctyl isophthalate; tetrahydrophthalic acid derivatives such as di-(2-ethylhexyl) tetrahydrophthalate, di-n-octyl tetrahydrophthalate, diisodecyl tetrahydrophthalate, and $C_7$–$C_{10}$ alkyl tetrahydrophthalates; adipic acid derivatives such as di-n-butyl adipate, di-(2-ethylhexyl) adipate, diisodecyl adipate, benzyl octyl adipate and di-(butoxy ethoxy ethyl) adipate; azelaic acid derivatives such as di-(2-ethylhexyl) azelate, diisoctyl azelate and di-2-ethylhexyl-4-thioazelate; sebacic acid derivatives such as di-n-butyl sebacate and di-(2-ethylhexyl) sebacate; maleic acid derivatives such as di-n-butyl maleate, dimethyl maleate and diethyl maleate; fumaric acid derivatives such as di-n-butyl fumarate and di-(2-ethylhexyl) fumarate; trimellitic acid derivatives such as tri-(2-ethylhexyl) trimellitate, tri-n-octyl trimellitate and criisodecyl trimellitate; citric acid derivatives such as triethyl citrate, tri-n-butyl citrate and acetyl triethyl citrate; itaconic acid derivatives such as monomethyl itaconate, monobutyl itaconate and dimethyl itaconate; oleic acid derivatives such as butyl oleate, tetrahydrofurfuryl oleate and glyceryl monoleate; ricinoleic acid derivatives such as methyl acetyl ricinolate, butyl acetyl richinolate and glyceryl monoricinolate; stearic acid derivatives such as n-butyl stearate, glyceryl monostearate and diethylene glycol distearate; and other compounds, for example diethylene glycol monolaurate, benzenesulfonic acid butylamide, trimethyl phosphate, tributoxyethyl phosphate, tetra-2-ethylhexyl pyromellitate, diethylene glycol dibenzoate, glycerol monoacetate, chlorinated paraffin, epoxy derivatives with an oxirane oxygen content of 2 to 9% and a molecular weight of not more than 1000, and polyesters with a molecular weight of at least 1000 derived from sebacid acid, adipic acid, azelaic acid, or phthalic acid.

When the amount of the liquid plasticizer is smaller than the specified limit, the resulting film is unsatisfactory in its operability in a bonding operation. When its amount exceeds the specified upper limit, the resulting film is unsuitable because of the loss of destructibility and poor dimensional stability.

The destructible marking film of the invention further contains a pigment. The amount of the pigment is not strictly limited, but especially good results are obtained when it is used in an amount of about 10 to about 150 parts by weight per 100 parts by weight of the vinyl chloride resin. Examples of the pigment include inorganic pigments such as titanium oxide, zinc oxide, lead white, calcium carbonate, gypsum, precipitated silica, carbon black, red iron oxide, molybdenum red, cadmium yellow, yellow lead, titanium yellow, chromium oxide green and ultramarine; and organic pigments such as Permanent Red 4R, Hansa Yellow 10G, Benzidine Yellow GR, Permanent Carmine FB, Phthalocyanine Blue B and Phthalocyanine Green.

Preferably, the destructible marking film of the invention further contains up to about 10% by weight, particularly about 1 to about 10 parts by weight of a lubricant per 100 parts by weight of the vinyl chloride resin. Almost all lubricants usually employed in the processing of vinyl chloride resins are also feasible in the present invention. For example, there can be used polyethylene waxes, liquid paraffin, stearic acid, stearamide, bisamide, n-butyl stearate, and aliphatic alcohols. The lubricant serves to increase the dimensional stability of the marking film of the invention after bonding, and frequently produces favorable results.

The marking film of the invention may further contain a small amount of a stabilizer in an amount of up to about 10 parts by weight per 100 parts by weight of the vinyl chloride resin. Specific examples of the stabilizer are calcium stearate, barium stearate, lead stearate, monobasic lead sulfite, dibasic lead sulfite, dibutyltin dilaurate, dibutyltin dimaleate, dibutyltin mercaptide, dioctyltin maleate-type stabilizers, dioctyltin laurate-type stabilizers, dioctyltin mercapto-type stabilizers, stannane diol derivatives, mixtures of these, and nonionic surface active agents such as polyoxyethylene, glycerin monostearate.

The destructible marking film of the invention can be produced by calendering the pigment-containing composition containing the aforesaid ingredients to form a film having a thickness of about 30 to about 60 microns. The operation of forming films by the calender process is well known, and the same operation can be used in the present invention. In the present invention, it is preferred that the film which has been formed by a calender machine be quenched with a gaseous cooling medium such as air, nitrogen or carbon dioxide at not more than 30° C., for example, at about −10° to about 30° C. at its necking portion.

Since the film of the invention is a destructible marking film, it is imperative to avoid an operation of forming an ultrathin film by stretching the film to an extent such that the destructibility (impact strength) of the film exceeds 60 kg.cm/mm. Thus, the calendering should be performed so that the film as-formed has a thickness of about 30 microns to about 60 microns. When a stretching action is to be exerted on the as-formed film, the stretch ratio should desirably be limited to not more than about 50%, preferably to not more than about 30%, in terms of the percentage of the surface linear speed of film take-up rolls based on the surface linear speed of film delivery rolls. The calendering temperature is about 140° to about 190° C., and the temperature at the time of stretching described above is about 50° to about 140° C.

According to the present invention, the use of the pigment-containing resin composition having the specified constituents and proportions described hereinabove makes it possible to commercially produce destructible marking films of good quality by a calender method which has not been utilized heretofore in the production of destructible marking films. The provision of such ultrathin destructible calender films for marking purposes has completely overcome the disadvantages of destructible films prepared by the conventional casting method.

The following examples illustrate the present invention more specifically.

EXAMPLE 1

| Formulation | Parts by weight |
|---|---|
| Polyvinyl chloride having a degree of polymerization of 1600 | 100 |
| Copolymer of pentyl methacrylate/methyl methacrylate (10/5) | 15 |
| Di-(2-ethylhexy) phthalate | 15 |
| Titanium oxide | 50 |
| Tin-type stabilizer | 2 |
| Polyethylene wax | 2 |

A composition of the above formulation was shaped by a calender method under the following conditions, and cooled with air at 25° C. to form a film having a thickness of 50 microns.

The temperatures of the various rolls used in the calender method were as follows:

Mixing roll: 175° C.
Warming roll: 175
Calender rolls
$R_1$: 175
$R_2$: 170
$R_3$: 165
$R_4$: 160

The stretch ratio of the film was 15%.

EXAMPLE 2

| Formulation | Parts by weight |
|---|---|
| Polyvinyl chloride having a degree of polymerization of 1100 | 100 |
| Copolymer of n-butyl methacrylate and methyl methacrylate (4/2) | 6 |
| Di-(2-ethylhexyl) adipate | 15 |
| Epoxidized soybean oil | 5 |
| Titanium oxide | 20 |
| Lead-type stabilizer | 3 |

-continued

| Formulation | Parts by weight |
|---|---|
| Stearamide | 1 |

A composition of the above formulation was shaped by a calender method under the following conditions, and cooled with air at 10° C. to form a film having a thickness of 60 microns.

All the rolls were kept at 170° C. during the shaping, and the stretch ratio of the film was 10%.

EXAMPLE 3

| Formulation | Parts by weight |
|---|---|
| Copolymer of vinyl chloride with 3% of propylene having a degree of polymerization of 800 | 100 |
| Copolymer of 2-ethylhexyl methacrylate and ethyl methacrylate (15/4) | 19 |
| Adipic acid-derived polyester | 7 |
| Phthalocyanine Blue | 5 |
| Light calcium carbonate | 10 |
| Barium-zinc type stabilizer | 4 |
| Bisamide | 4 |

A composition of the above formulation was shaped by a calender method under the following conditions, and cooled with air at 10° C. to form a film having a thickness of 40 microns.

The temperatures of the various rolls used in the calender method were as follows:

Mixing roll: 170° C.
Warming roll: 170
Calender rolls
$R_1$: 170
$R_2$: 170
$R_3$: 175
$R_4$: 180

The stretch ratio of the film was 20%.

Comparative Example 1

Example 1 was repeated except that the stretch ratio of the film was changed to 100%.

Comparative Example 2

A composition of the same formulation as in Example 1 was cast into a film having a thickness of 50 microns. A solvent consisting of methyl ethyl ketone and toluene in a ratio of 80:20 was used, and the composition was cast on a 80 m-long stainless steel belt, and dried in an atmosphere kept at 80° to 160° C. No cooling was performed. The stretch ratio of the film was 5%.

Comparative Example 3

| Formulation | Parts by weight |
|---|---|
| Polyvinyl chloride having a degree of polymerization of 1600 | 100 |
| Copolymer of pentyl methacrylate and methyl methacrylate (20/8) | 28 |
| Di-(2-ethylhexyl) phthalate | 15 |
| Titanium oxide | 50 |
| Tin-type stabilizer | 2 |
| Polyethylene wax | 2 |

Except using a composition of the above formulation, the same procedure as in Example 1 was repeated.

Comparative Example 4

| Formulation | Parts by weight |
|---|---|
| Polyvinyl chloride having a degree of polymerization of 1100 | 100 |
| Copolymer of n-butyl methacrylate and methyl methacrylate (3/1) | 4 |
| Di-(2-ethylhexyl) phthalate | 15 |
| Epoxidized soybean oil | 5 |
| Titanium oxide | 50 |
| Lead-type stabilizer | 30 |
| Stearamide | 1 |

A composition of the above formulation was shaped by a calender method under the same compositions as in Example 2 to form a film having a thickness of 60 microns.

Comparative Example 5

A composition of the same formulation as in Comparative Example 4 was used except that 35 parts by weight of dioctyl phthalate was used instead of the dioctyl phthalate and epoxidized soybean oil. The composition was calendered under the same conditions as in Example 1.

Comparative Example 6

| Formulation | Parts by weight |
|---|---|
| Copolymer of vinyl chloride and 18% by weight of vinyl acetate having a degree of polymerization of 600 | 100 |
| Copolymer of n-butyl methacrylate and methyl methacrylate (10/5) | 15 |
| Di-(2-ethylhexyl) phthalate | 20 |
| Titanium oxide | 110 |
| Stearic acid | 0.5 |

A composition of the above formulation was cast into a film having a thickness of 50 microns under the same conditions as in Comparative Example 2.

The various properties of the films obtained in these Examples and Comparative Examples were measured by the following methods, and the results are shown in Table 1.

Destructibility

Measured at 25° C. by a film impact tester (capacity 30 kg.cm, impact speed 2.2 km/sec., an impact ball with a radius of 1 inch) in accordance with a punch-type impact testing method.

Operability in Bonding

The operability is evaluated by the height of the head of a rivet with a diameter of 10 mm to which the film coated with an adhesive can be applied without breakage or rising.

1: a height of more than 4 mm
2: a height of 4 to 3 mm
3: a height of 3 to 2 mm
4: a height of 2 to 1 mm
5: a height of less than 1 mm The larger the height, the better the operability.

Thermal Stability

The film, white in color, bonded to an aluminum plate is allowed to stand in a Geer's oven at 150° C. for 40 minutes. It is then taken out of the oven, and its color is evaluated on a scale of 1 to 4 as follows:

1: no change in color
2: changed to light pink
3: changed to light violet
4: changed to violet This change in color is especially significant when the film is intended for application to parts requiring thermal stability, for example to an engine compartment of an automobile.

Surface Smoothness

Ten squares (10×10 cm) were drawn at random on the film. Light is applied from below the film, and the number of points having high light transmittance present in each square is visually counted. The smoothness is evaluated by the total number of such points in the ten squares.

Microscopic examination shows that these points are depressed like pockmarks. These depressed points are very significant because they may cause ink skip when the film is printed.

Productivity

The maximum speed at which the film can be produced without the occurrence of defects.

TABLE 1

| Example (Ex.) or Comparative Example (CEx.) | Destructibility (kg . cm/mm) | Operability in bonding | Thermal stability | Surface smoothness | Productivity (m/min.) | Remarks |
|---|---|---|---|---|---|---|
| Ex. 1 | 9 | 2 | 1 | 1 | 30 | |
| Ex. 2 | 40 | 1 | 1 | 0 | 40 | |
| Ex. 3 | 35 | 2 | 1 | 3 | 35 | |
| CEx. 1 | 15 | 4 | 1 | 50 (pinholes) | 50 | The film had too strong directionality to be practical. |
| CEx. 2 | 95 | 1 | 1 | more than 1000 | 20 | |
| CEx. 3 | 3 | 5 | 1 | 20 | 10 | Roll tackiness was high. The film had poor solvent resistance. |
| CEx. 4 | 100 | 3 | 1 | 30 | 15 | |
| CEx. 5 | 120 | 1 | 1 | 3 | 35 | The film had poor dimensional stability. |

TABLE 1-continued

| Example (Ex.) or Comparative Example (CEx.) | Destructibility (kg . cm/mm) | Operability in bonding | Thermal stability | Surface smoothness | Productivity (m/min.) | Remarks |
|---|---|---|---|---|---|---|
| CEx. 6 | 5 | 5 | 4 | 570 | 15 | |

What we claim is:

1. A process for preparing a destructible marking film having a thickness of about 30 to about 60 microns and a destructibility of not more than 60 kg.cm/mm, which comprises shaping a resin composition by calendering, said resin composition consisting essentially of (A) 100 parts by weight of a vinyl chloride resin having a degree of polymerization of about 600 to about 2000 and containing 0 to about 5% by weight of a comonomer unit, (B) about 5 to about 20 parts by weight of an alkyl methacrylate resin, which is a blend of an alkyl methacrylate polymer with an alkyl group containing 1 to 3 carbon atoms and an alkyl methacrylate polymer with an alkyl group containing 4 to 10 carbon atoms, or a copolymer of an alkyl methacrylate with an alkyl group containing 1 to 3 carbon atoms and an alkyl methacrylate with an alkyl group containing 4 to 10 carbon atoms, (C) about 5 to about 30 parts by weight of a liquid plasticizer, and (D) about 10 to about 150 parts by weight of a pigment.

2. The process of claim 1 wherein the as-formed film is quenched by a gaseous coolant having a temperature of not more than about 30° C.

3. The process of claim 1 wherein the as-formed film is stretched at a stretch ratio of 0 to about 50% expressed by the percentage of the surface linear speed of film take-up rolls based on the surface linear speed of film delivery rolls.

4. A method for marking, which comprises applying to the surface of a substrate a destructible film having a thickness of about 30 to about 60 microns and a destructibility of not more than 60 kg.cm/mm, said film consisting essentially of (A) 100 parts by weight of a vinyl chloride resin having a degree of polymerization of about 600 to about 2000 and containing 0 to about 5% by weight of a comonomer unit, (B) about 5 to about 20 parts by weight of an alkyl methacrylate resin, which is a blend of an alkyl methacrylate polymer with an alkyl group containing 1 to 3 carbon atoms and an alkyl methacrylate polymer with an alkyl group containing 4 to 10 carbon atoms, or a copolymer of an alkyl methacrylate with an alkyl group containing 1 to 3 carbon atoms and an alkyl methacrylate with an alkyl group containing 4 to 10 carbon atoms, (C) about 5 to about 30 parts by weight of a liquid stabilizer, and (D) about 10 to about 150 parts by weight of a pigment.

* * * * *